United States Patent
Moroda

(10) Patent No.: US 7,979,745 B2
(45) Date of Patent: Jul. 12, 2011

(54) ON-CHIP DEBUG EMULATOR, DEBUGGING METHOD, AND MICROCOMPUTER

(75) Inventor: Takahiro Moroda, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 554 days.

(21) Appl. No.: 12/076,064

(22) Filed: Mar. 13, 2008

(65) Prior Publication Data

US 2008/0229152 A1 Sep. 18, 2008

(30) Foreign Application Priority Data

Mar. 15, 2007 (JP) ................... 2007-066364

(51) Int. Cl.
*G06F 11/24* (2006.01)
(52) U.S. Cl. ................. 714/28; 714/30; 714/31; 703/28
(58) Field of Classification Search .................... 714/28, 714/30; 703/28
See application file for complete search history.

(56) References Cited

U.S. PATENT DOCUMENTS

| 6,000,040 | A  | * | 12/1999 | Culley et al. ..................... 714/31 |
| 6,205,560 | B1 | * | 3/2001  | Hervin et al. .................... 714/34 |
| 2001/0028590 | A1 | * | 10/2001 | Ishikawa et al. ............. 365/226 |
| 2002/0046016 | A1 | * | 4/2002  | Debling .......................... 703/28 |
| 2002/0059542 | A1 | * | 5/2002  | Debling .......................... 714/28 |
| 2002/0174385 | A1 | * | 11/2002 | Cofler et al. ..................... 714/38 |
| 2003/0033584 | A1 | * | 2/2003  | Zaveri et al. .................... 716/17 |
| 2004/0078690 | A1 | * | 4/2004  | Kohashi .......................... 714/38 |
| 2005/0172183 | A1 | * | 8/2005  | Bybell ........................... 714/724 |
| 2005/0210345 | A1 | * | 9/2005  | Bybell ........................... 714/724 |
| 2006/0206763 | A1 | * | 9/2006  | Kudo ............................. 714/30 |
| 2007/0006035 | A1 | * | 1/2007  | Usui ............................. 714/38 |
| 2007/0044158 | A1 | * | 2/2007  | Cruzado et al. ................. 726/27 |
| 2007/0168147 | A1 | * | 7/2007  | Cannon et al. ................ 702/117 |
| 2007/0220337 | A1 | * | 9/2007  | Itoh et al. ........................ 714/30 |
| 2008/0126862 | A1 | * | 5/2008  | Pyska et al. .................... 714/28 |

FOREIGN PATENT DOCUMENTS

JP 2002-366378 12/2002

* cited by examiner

*Primary Examiner* — Scott T Baderman
*Assistant Examiner* — Chae Ko
(74) *Attorney, Agent, or Firm* — McGinn IP Law Group, PLLC

(57) ABSTRACT

An on-chip debug emulator is capable of connecting to the target device and the host device for remotely debugging the program in the target device. The on-chip debug emulator contains a debug communication control unit. This debug communication control unit contains a plurality of serial communication circuits, the plurality of serial communication circuits are commonly provided with a clock signal. The debug communication control unit controls communications with the target device based on commands output from the host device. Each of The plurality of serial communication circuits contains a data buffer and serially transmits data stored in the data buffer to and from the target device while synchronized with the clock signal. Namely, the plurality of serial communication circuits communicate in parallel while operating synchronized with the same clock. The on-chip debug emulator can in this way be made utilizing a low-cost microcomputer not containing any parallel communication circuits.

9 Claims, 12 Drawing Sheets

ON-CHIP DEBUG EMULATOR, DEBUGGING METHOD, AND MICROCOMPUTER

BACKGROUND OF THE INVENTION

1. Field of the Invention

This invention relates to technology for remote debugging by utilizing programs executed on a target device, and more specifically relates to technology for debugging by utilizing an on-chip debug emulator.

2. Description of Related Art

The full-function in-circuit emulator (hereafter called full ICE) and the on-chip debug emulator (hereafter called OCD) are known in the art as emulators for remotely debugging programs executed on the target device.

When using full ICE, a target device made up of a target board with a socket connecting to the full ICE is mounted in place of the microcomputer. During debugging, the full ICE is connected to the target board instead of the microcomputer. An emulator chip for emulating CPU functions built into the full ICE or peripheral emulator chips for emulating peripheral functions then emulate (simulate) the microcomputer operation based on commands from a host device such as a debugger on a personal computer. Debug circuits are formed inside and outside the emulator chip in the full ICE, and a probe cable for transferring all signals used by the target device microcomputer is connected to the target board and the full Ice.

The full ICE provides a full range of debugging functions using debug circuits both inside and outside the emulator chip, and can debug nearly all the terminals on the microcomputer. However the full ICE is expensive and must be designed to match the individual microcomputer. Moreover the emulation is performed by the emulator chip so the operation may differ from that of the actual microcomputer.

In the case of the OCD, the debug circuits are in the microcomputer itself in the target device. The OCD connects to the debug circuits within the microcomputer on the target device by way of a debug interface (I/F) and data for commands from the host device are transferred to and from the microcomputer. A dedicated connector for connecting to the OCD is installed on the target device.

The debug circuits inside the OCD take up the available circuit surface area on the microcomputer. The debugging function is also relatively weak compared to full ICE because some terminals cannot be debugged, the debugging can be performed at high speed. Moreover, there is little difference between debugging and actual operation so that OCD is ideal for final debugging and parameter adjustment on the actual device.

Due to these circumstances, OCD has become widely utilized in recent years since it offers the advantage that debugging can be performed while the microcomputer is still mounted on the target device. Many diverse types of debug I/F (hereafter called interface) are utilized with OCD but the JTAG I/F proposed by the JETAG (Joint European Test Action Group. (Currently JTAG) and based on the IEEE std. 1149.1-1990 "Standard Access Port and Boundary-Scan Architecture" created by the US Institute of Electrical and Electronic Engineers is often used. The JTAG I/F is a standard I/F and therefore offers advantages such as a small number of pins and easy creation of the emulator.

A debug system utilizing OCD is disclosed in JP 2002-366378 A. This debug system as shown in FIG. 12 (FIG. 1 of JP 2002-366378 A) contains a JTAG interface circuit 2 (JTAG I/F) between the target device and a host computer 1. On the target device, a microcomputer containing a Central Processing Unit (CPU) 8 and a memory 19 are installed on the target board 3. A debugger 4 is installed on the host computer. A JTAG debug module 5 serving as the dedicated debug circuit is installed on the CPU8. A parallel cable 6 connects the debugger 4 and the JTAG interface circuit 2. A wire 9 on the substrate, and the JTAG dedicated cable 7 connect the JTAG interface circuit 2 and the JTAG debug module 5.

To improve the debugging efficiency, communication must be performed in parallel between the JTAG interface circuit 2 and the host computer 1, and also between the JTAG interface circuit 2 and the target board 3. The JTAG interface circuit 2 can perform parallel communication with the JTAG debug module 5 and the debugger 4 by way of the JTAG dedicated cable 7 and the parallel cable 6.

The JTAG interface circuit 2 includes a host I/F circuit for communication and (communication) control of the debugger 4 in the host computer 1, and a JTAG controller for communication and (communication) control of the JTAG debug module 5 on the target board 3. The JTAG interface circuit 2 communicates with the JTAG debug module 5 on the JTAG interface communication system, and converts the host computer 1 communication system to JTAG interface communication system.

The JTAG controller is normally a dedicated circuit and in most cases is made up of a Field Programmable Gate Array (FPGA) or gate arrays. The FPGA and gate arrays are high-priced and therefore have the problem that the OCD itself is also expensive.

To resolve the aforementioned problems, a method was contrived for using an inexpensive general-purpose microcomputer to perform certain JTAG controller functions or more specifically, control functions. In this method, the general-purpose microcomputer makes up a section of the JTAG controller so a FGPA is not used in that section. The cost of the JTAG controller can therefore be lowered, and consequently the OCD itself can also be inexpensively made.

However in the present times where companies are striving to reduce costs as much as possible, demands are being made to reduce the OCD cost even further. Executing all the JTAG controller functions on a general-purpose microcomputer is preferable for lowering the cost even more than in the above methods. Using a general-purpose microcomputer instead of the JTAG controller would eliminate the need for a high-priced device such as an FGPA and therefore lower the OCD cost even further.

Besides the control section however, the JTAG controller also contains a parallel target I/F circuit for transmitting data in parallel to and from the microcomputer on the target board.

The present inventor has recognized that there is no inexpensive general-purpose microcomputer containing an internal parallel I/F circuit and so a high-priced microcomputer containing a parallel I/F circuit serving as the target I/F circuit must be utilized making it impossible to reduce the cost.

SUMMARY

The present invention seeks to solve one or more of the above problems, or to improve upon these problems at least in part.

In one embodiment, the on-chip debug emulator is capable of connecting to the target device and the host device for remotely debugging the program in the target device, and the on-chip debug emulator contains a debug communication control unit. This debug communication control unit contains a plurality of serial communication circuits, the plurality of serial communication circuits are commonly provided with a clock signal. The debug communication control unit controls communications with the target device based on commands output from the host device. Each of The plurality of serial communication circuits contains a data buffer and serially transmits data stored in the data buffer to and from the target device while synchronized with the clock signal. The plurality of serial communication circuits in other words, communicate in parallel while operating synchronized with the same clock. The on-chip debug emulator can in this way be made utilizing a low-cost microcomputer not containing any parallel communication circuits.

In another embodiment, the debug system includes a host device, a target device, and an on-chip debug emulator connected between the host device and the target device. The on-chip debug emulator contains the plurality of serial communication circuits. Each of the plurality of serial communication circuits includes a data buffer and serially transmits data stored in the data buffer to and from the target device while synchronized with a clock signal. The debugging method used in this debug system includes the following processes. The host device transmits commands to the on-chip debug emulator. A shared clock signal is supplied to the plurality of serial communication circuits. Data is serially transmitted between the target device and the plurality of serial communication circuits according to commands while synchronized with the clock signal.

In yet another embodiment, the microcomputer includes a storage (memory) circuit, a central processing unit for loading and executing programs stored in the storage circuit, a plurality of serial communication circuits, a plurality of clock terminals, and a switching circuit. Each of the plurality of serial communication circuits include a data buffer and a clock node. Each of the plurality of serial communication circuits serially transmits data stored in the data buffer to and from an externally connected device while synchronized with the clock signal. Each of the plurality of clock terminals is provided for the clock nodes in the plurality of serial communication circuits. The switching circuit switches between a state where each clock node is connected to one specified clock terminal among multiple clock terminals; and a state where each clock node is connected to its own clock terminal.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The present invention will now be described herein with reference to the illustrative embodiments. Those skilled in the art will recognize that many alternative embodiments can be accomplished using the teachings of the present invention and that the invention is not limited to the embodiments illustrated for explanatory purposes. The principle of the debug system in the present invention will be described first, before relating the detailed description of the preferred embodiments.

Figure 1:
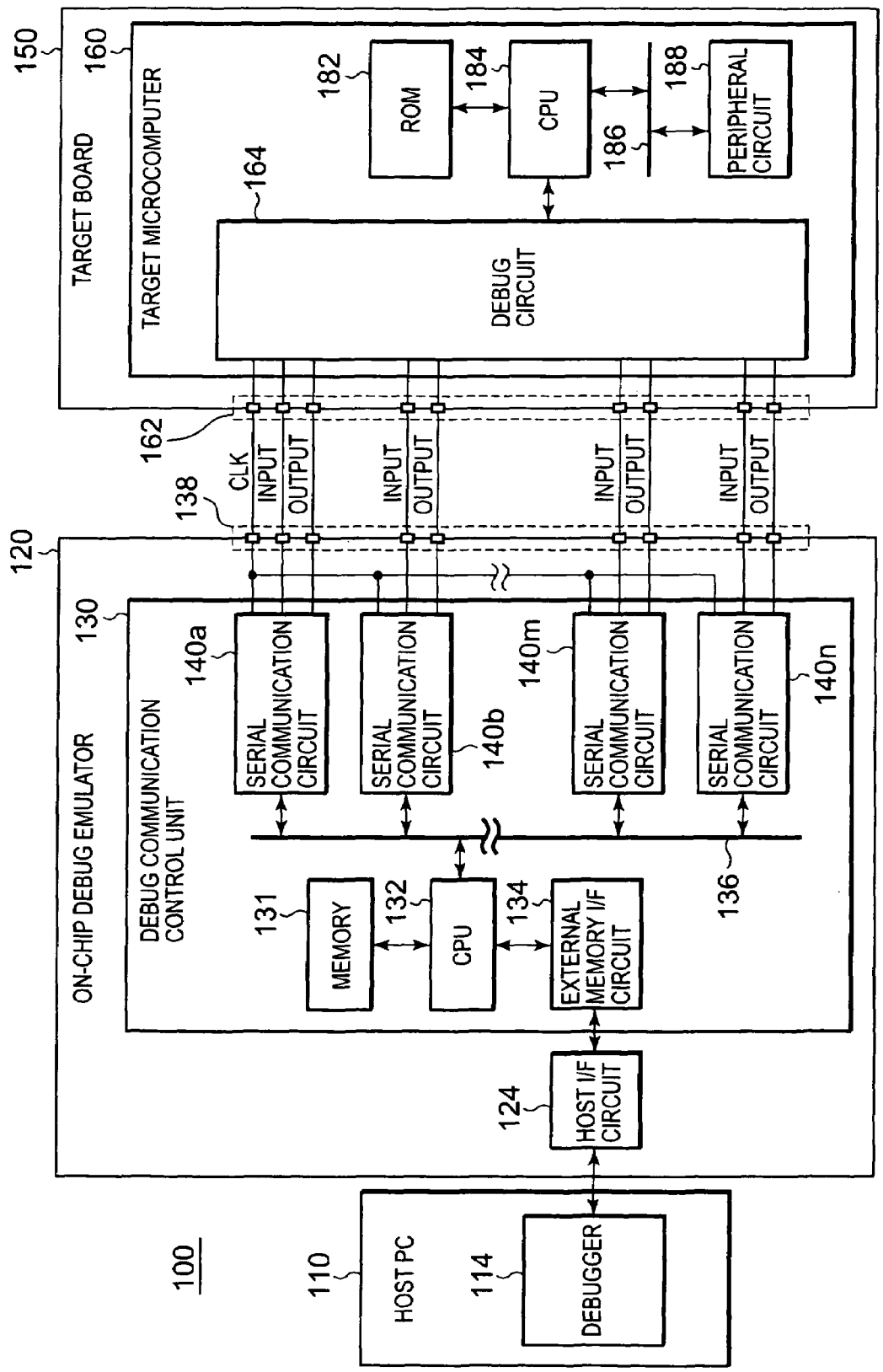
FIG. 1 is a block diagram for showing the debug system utilized for describing the principle of this invention.

FIG. 1 shows a debug system 100 based on the principle of this invention. The debug system 100 includes a host computer (hereafter called the host PC) 110 serving as the host device, a target device made up of the target board 150 and the target microcomputer 160 installed in the target board 150, and an on-chip debug emulator (hereafter simply called emulator) 120 connected between the target device and the host PC110, for controlling communications with the target device based on commands from the host PC110.

A debugger 114 for remotely debugging the target device is installed in the host PC110.

The target microcomputer 160 includes a debug circuit 164, a Read Only Memory (ROM) 182, a Central Processing Unit (CPU) 184, and a peripheral circuit 188. The CPU184 and the peripheral circuit 188 are connected by a bus 186. The CPU184 connects to both the debug circuit 164 and the ROM182. An emulator I/F connector 162 is installed on the target board 150. The debug circuit 164 for the target microcomputer, and a debug communication control unit 130 (described later) of emulator 120 are connected to the target board 150 by way of the emulator I/F connector 162. Each function block of the target board 150 operates in coordination under the control of the emulator 120. The target microcomputer 160 may be a single chip or may be multiple chips. The target microcomputers in each of the subsequent embodiments may also be a single chip or multiple chips.

The emulator 120 includes a host interface circuit (hereafter called a host I/F circuit) 124 for connecting to the host PC110, and the debug communication control unit 130 for controlling communications with the target device based on commands from the debugger 114 of the host PC110 by way of the host I/F circuit 124, and a target I/F connector 138 for connecting the debug communication control unit 130 to the debug circuit 164 on the target microcomputer 160.

The debug communication control unit 130 contains a function block made up of a microcomputer normally considered a general-purpose microcomputer. As shown in the figure, the debug communication control unit 130 includes a CPU13 serving as a central processing unit, a memory 131 for storing different types of data for processing in the CPU132, and an external memory interface circuit (hereafter called external memory I/F circuit) 134 for connecting the CPU132 with the host I/F circuit 124, and multiple serial communication circuit 140a-140n. A bus 136 connects the CPU132 to each serial communication circuit.

When the debugger 114 issues a debugging related command to the emulator 120, the emulator 120 generates and outputs data and a command for transmitting to the target device based on that command. The emulator 120 also receives data transmitted from the target device, specifically the debug circuit 164, and outputs this to the debugger 114 according to that data and command. The CPU132 generates hat command and data, and controls communication between the debug circuit 164 and the multiple serial communication circuits.

The debug circuit 164 transmits and receives the commands and data by parallel communication to (and from) the debug communication control unit 130.

The serial communication circuits 140a-140n exchange data/commands) by parallel communication with the debug circuit 164, by receiving the reception signal inputs and transmitting the transmission signal output while synchronized with the clock signal CLK output from the serial communication circuit 140a.

The serial communication circuits are each described next in detail. The serial communication circuits 140b-140n all possess the same structure and functions so the description and drawing only cover the serial communication circuit 140a and the serial communication circuit 140b. When set to Master, the serial communication circuit generates clocks for its own transmission/reception circuit and then outputs the generated clock. When set to Slave, the serial communication circuit receives the clock signal and supplies that received clock signal to the internal transmission/reception circuit. The master or slave setting is made by way of the CPU132. In the following description, the serial communication circuits serving as the master and the serial communication circuits serving as the slave, respectively indicate serial communication circuits set to master and serial communication circuits set to slave.

Figure 2:
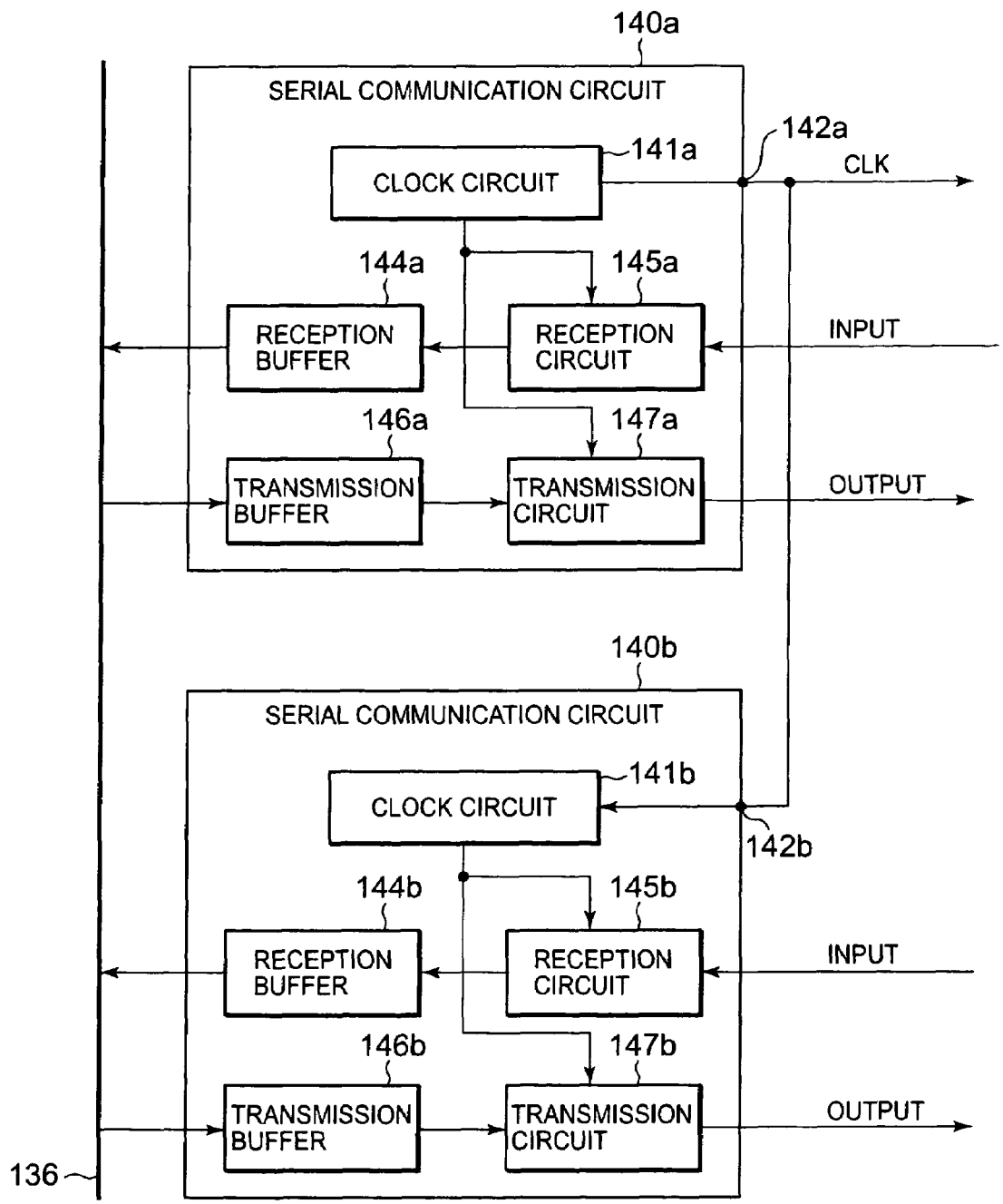
FIG. 2 is a block diagram for describing the serial communication circuits in the debug system shown in FIG. 1.

FIG. 2 shows the structure of the serial communication circuit 140a and the serial communication circuit 140b. The serial communication circuit 140a is a master, and includes a clock circuit 141a, a reception circuit 145a for serially receiving signals (reception signal input) from the target device, a reception buffer 144a for temporarily storing signals received from the reception circuit 145a, a transmission buffer 146a for temporarily storing signals for output to the target device, a transmission circuit 147a for serially outputting signals stored in the transmission buffer 146a to the target device as transmission signal output, and a clock node 142a. The clock circuit 141a generates clocks to supply to the reception circuit 145a and the transmission circuit 147a, and also externally outputs clock signals (clock signal CLK) generated via the clock node 142a. The reception circuit 145a and the transmission circuit 147a transmit and receive while synchronized with clocks supplied from the clock circuit 141a.

The serial communication circuit 140b is a slave, and includes, a clock circuit 141b, a reception buffer 144b, a reception circuit 145b, a transmission buffer 146b, a transmission circuit 147b, and a clock node 142b. The clock node 142b connects to the clock node 142a of the serial communication circuit 140a. The clock circuit 141b receives the clock signal CLK by way of the clock node 142b, and supplies that clock signal CLK to the reception circuit 145b and the transmission circuit 147b. The reception circuit 145b and the transmission circuit 147b therefore transmit and receive while synchronized with the clock signal CLK output from the clock circuit 141a of the serial communication circuit 141a.

In other words, among these multiple serial communication circuits, the serial communication circuit 140a is the master, and the serial communication circuits 140b-140n are the slaves. All of the serial communication circuits transmit and receive while synchronized to the same clock signal CLK.

Returning now to FIG. 1, the clock signal CLK is also input to the clock input terminal on the debug circuit 164. The reception circuit in each serial communication circuit is connected to the data output terminal of debug circuit 164. The transmission circuit connects to the data input terminal of debug circuit 164. The clock input terminal, the data output terminal, the data input terminal on the debug circuit 164 connect to the emulator I/F connector 162. These connections are omitted here from the drawing.

By using this structure, parallel communication for transmitting or receiving a maximum n number of bits can be achieved between the debug communication control unit 130 and the debug circuit 164. The line for transmitting and receiving the clock signal CLK between the slave and the master is formed outside the microcomputer as shown in FIG. 1 and FIG. 2 so there is no need to change the internal microcomputer wiring. Parallel data exchange with the target device can in other words be achieved with an inexpensive microcomputer with no parallel communication circuit.

A specific system utilizing the above principle is described next.

First Embodiment

Figure 3:
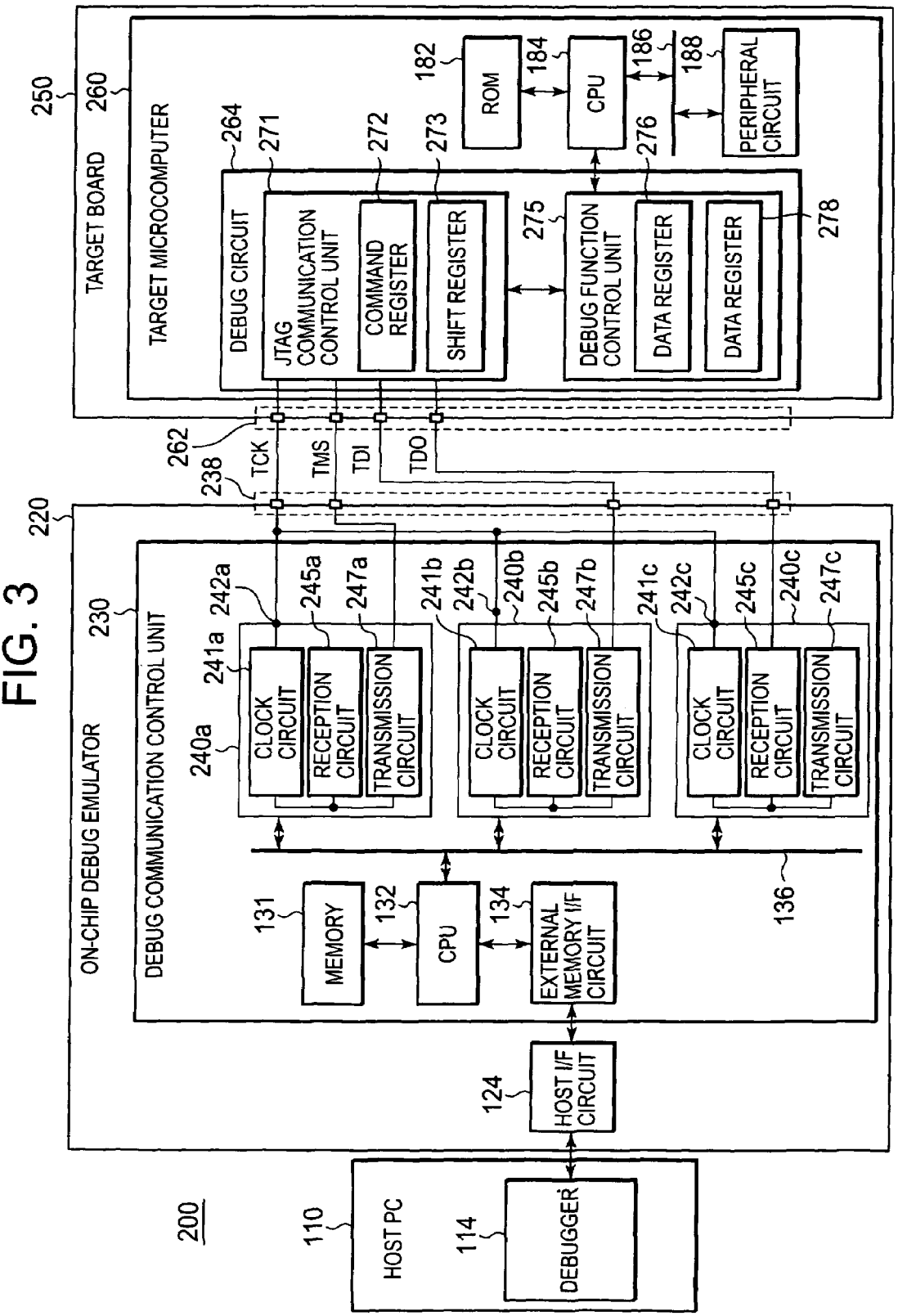
FIG. 3 is a diagram showing the debug system for the first embodiment of this invention.

FIG. 3 shows a debug system 200 of the first embodiment of this invention. In the subsequent description and drawings, the same reference numerals are assigned to sections with the same structure or functions as the debug system 100, and a detailed description of those sections is omitted.

The debug system 200 includes a host PC110, a target device including a target board 250 and a target microcomputer mounted on that board, and an on-chip debug emulator (hereafter simply called emulator) 220 connected between the host PC110 and the target device for controlling communications with the target device based on commands from the host PC110.

The debug system 200 of the first embodiment conforms to JTAG. The debug circuit 264 formed in the target microcomputer 260 includes a JTAG communications control unit 271 for JTAG communication with the emulator 220, and a debug function control unit 275 for performing debugging based on data from the JTAG communications control unit 271. The JTAG communications control unit 271 connects by way an emulator I/F connector 262 on the target board 250 to the debug communications control unit 230 (described later) in the emulator 220.

The JTAG communications control unit 271 contains a command register 272 for storing commands transmitted from the emulator 220, and a shift register 273 for transferring data transmitted from the emulator 220 to the debug function control unit 275, and transmitting data loaded from the debug function control unit 275 to the emulator 200. These registers are the same as those registers making up a general-purpose JTAG communication control circuit.

The debug function control unit 275 contains different data registers such as data registers 276 and data registers 278. Debugging is performed based on the data values stored in these registers, and data obtained from this debugging is written to be transmitted to the emulator 220. The JTAG communications control unit 271 reads and writes by way of the shift register 273 on these data registers in compliance with commands stored in the command register 272.

The emulator 220 includes a host I/F circuit 124 for connecting to the host PC110; a debug communication control unit 230 for controlling communications with the target device based on commands received via the host I/F circuit 124 from the debugger 114 of host PC110; and a target I/F connector 238 for connecting the debug communication control unit 230 to the JTAG communication control unit 271 in the debug circuit 264.

The debug communication control unit 230 includes function blocks normally used in general-purpose microcomputers and that make up the microcomputer. As shown in the figure, the debug communication control unit 230 includes a CPU132 serving as the central processor unit, a memory 131 for storing different types of data for processing by the CPU 132, an external memory I/F circuit 134 for connecting the host I/F circuit 124 with the CPU132, and three serial communication circuits 240a-240c. A bus 136 connects the CPU132 with each of the serial communication circuits.

The flow of the debugging processing is described here. The function of the emulator 220 is omitted here in order to make the description easier to understand.

The user operates the host PC110. The user loads the program code in the ROM182 on the target microcomputer 260 by way of the debugger 114 operated by the host PC110, and executes the program and performs debugging, etc.

During normal target microcomputer 260 operation, the user inputs a command (debugging start command) from the debugger 114 to perform debugging.

After receiving the command entered by the user, the debugger 114 investigates the address that was input, and loads and stores the command in the applicable address in the ROM182 of target microcomputer 260. The address for that command, and the command input by the user are stored at this time.

The debugger 114 writes a command in the target microcomputer 260 for entering debugging mode, into the address where the user input the debugging start command.

The target microcomputer 260 executes one after another the programs loaded in the ROM182, and on reaching the above command, executes it. The target microcomputer 260 is now in debugging mode.

The debugger 114 monitors the status of the debug circuit 264 and therefore knows when the target microcomputer 260 is set to debugging mode. After detecting that the target microcomputer 260 is in debugging mode, the debugger 114 executes the debugging by processes such as memory read/write and register read, to perform debugging.

When finished debugging, the debugger 114 controls the target microcomputer 260 to loads and execute the command initially in the address where the debugging start command was inserted. The target microcomputer 260 is in this way returned from debugging mode to normal operation mode.

This processing is performed by transmitting and receiving data and command between the host PC110 and the target microcomputer 260. The transmitting and receiving of all data between the host PC110 and the target microcomputer 260 is carried out via the emulator 220.

The emulator 220 converts the host PC110 communication system, to the JTAG communication system, to transmit and receive data between the debugger 114 and the target microcomputer 260.

The CPU 132 inputs data and commands transmitted from the debugger 114 to the transmission buffer of the applicable serial communication circuit, and outputs data from the debug circuit 264 temporarily stored in the reception buffer of the serial communication circuit that itself received the data to the debugger 114.

Figure 4:
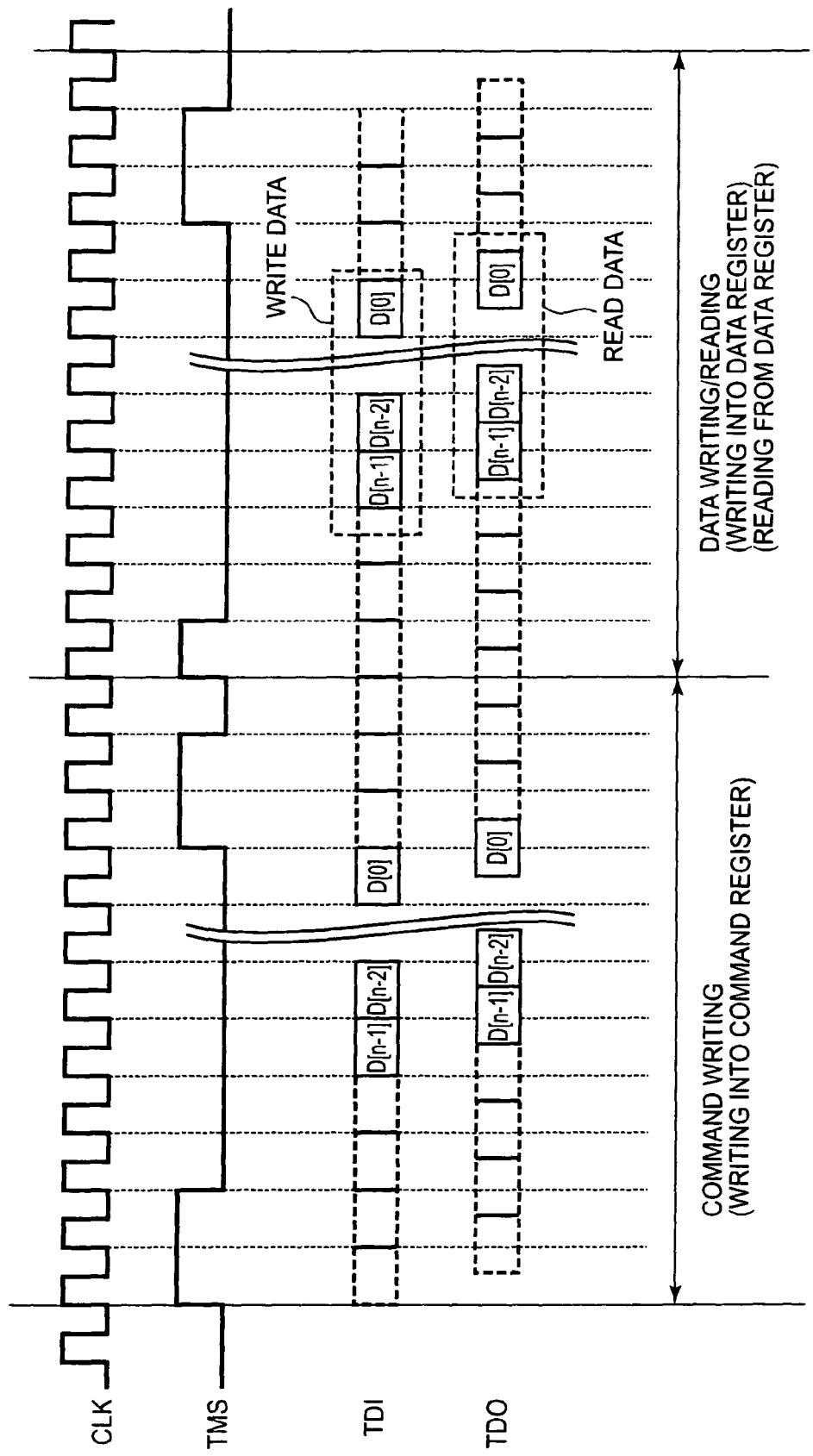
FIG. 4 is a chart showing the JTAG protocol.

Communication with the debug circuit 264 is performed via the JTAG method. Here the JTAG communication protocol is described first. The JTAG communication as shown in FIG. 4, utilizes the clock signal TCK, an operation mode control signal TMS, an output signal TDI such as data and commands output to the target device, and the four signals for the input signal TDO serving as the data input from the target device to the emulator. Among these signals, the operation mode control signal TMS and the output signal TDI are signals output from the emulator to the target device; and the input signal TDO is a signal output from the target device to the emulator.

The operation mode control signal TMS, output signal TDI, and input signal TDO are transmitted and received while synchronized with the clock signal TCK. More specifically, the output signal TDI for writing commands and data from the emulator to the target device; is executed two clocks after the falling edge of the operation mode control signal TMS for switching the target device to debugging mode; and the data output from the target device or in other words, the output of data (input signal TDO) loaded by the emulator from the target device, is executed one clock after the output of the output signal TDI starts. The debug communication control unit 230 conforms to this protocol to communicate with the debug circuit 264 via the serial communication circuits 240a-240b.

Now returning to FIG. 3, the individual serial communication circuits are described. Though omitted in FIG. 3 for easier understanding, a reception buffer and a transmission buffer are provided in each of the serial communication circuits the same as in conventional serial communication type circuit.

Among these serial communication circuits 240a-240c, the serial communication circuits 240a is the master, and fulfills the task of outputting the clock signal TCK, and the operation mode control signal TMS. The serial communication circuits 240a as shown in FIG. 3, includes a clock circuit 241a, a clock node 242a, a reception circuit 245a, and a transmission circuit 247a.

The clock circuit 241a generates a clock signal TCK and supplies it to the reception circuit 245a and the transmission circuit 247a. The clock node 242a outputs the clock signal TCK and this clock signal TCK is also input to the clock input terminal of the debug circuit 264.

This embodiment does not utilize the reception circuit 245a of serial communication circuit 240a.

The transmission circuit 247a of serial communication circuit 240a connects via the target I/F connector 238 to the JTAG communication control unit 271, and also outputs the operation mode control signal TMS to the JTAG communication control unit 271 while synchronized to the clock signal TCK.

The serial communication circuit 240b includes a clock node 242b, a clock circuit 241b, a reception circuit 245b, and a transmission circuit 247b. This embodiment does not utilize the reception circuit 245b. The transmission circuit 247b connects to the JTAG communication control unit 271 via the target I/F connector 238, and fulfills the task of outputting the output signal TDI. The clock node 242b connects to the clock node 242a of the serial communication circuit 240a and so the clock circuit 241b receives the clock signal TCK by way of the clock node 242b. The transmission circuit 247b therefore also operates while synchronized to the clock signal TCK.

The serial communication circuit 240c includes a clock node 242c, a clock circuit 241c, a reception circuit 245c, and a transmission circuit 247c. This embodiment does not utilize the transmission circuit 247c. The reception circuit 245c fulfills the task of receiving the input signal TDO. The clock node 242c connects to the clock node 242a of the serial communication circuit 240a and so receives the clock signal TCK by way of the clock node 242c. The reception circuit 245c therefore also operates while synchronized to the clock signal TCK. The serial communication circuit 240b and the serial communication circuit 240c are in other words slaved to the serial communication circuit 240a.

The clock signal TCK, the operation mode control signal TMS, the output signal TDI and the input signal TDO are respectively simply referred to as TCK, TMS, TDI and TDO in the following description.

Figure 5:
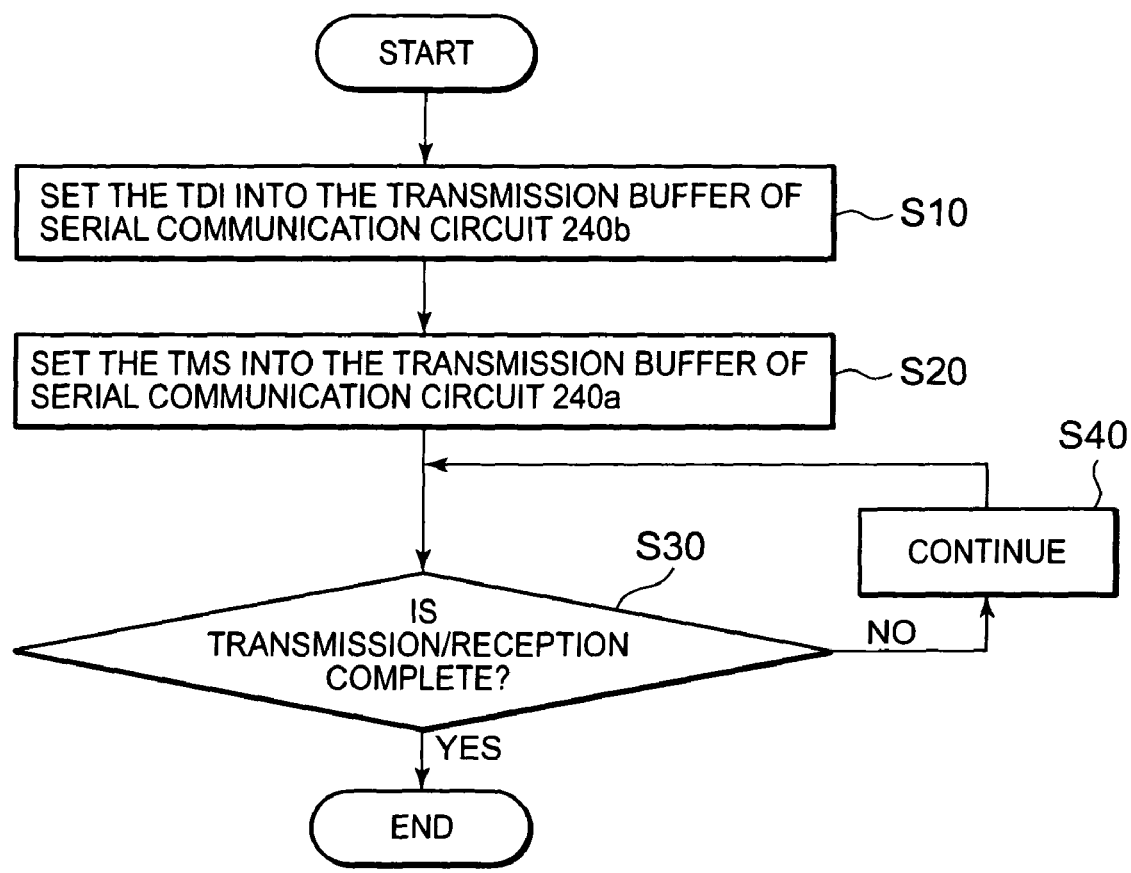
FIG. 5 is a flow chart showing the writing onto the target device in the debug system shown in FIG. 3.

FIG. 5 is a flow chart showing the operation when the debug communication control unit 230 is outputting (writing) data to the target device. The CPU132 sets the TMS and the TDI (S10, S20) in the transmission buffer of the serial communication circuit 240b and the serial communication circuit 240a each time data is written onto the target device. Communication between the debug communication control unit 230 and the debug circuit 264 starts when data is written into the transmission buffer of the serial communication circuit 240a.

The above process continues until the transmission and reception of data is complete (S30: No, S40). The serial communication circuit 240a and serial communication circuit 240c operation then ends when transmission and reception of data relating to the writing has ended (S30: Yes).

Data that the debug communication control unit 230 outputs to the target device from the write processing in FIG. 5 is written in the command register 272 if a command, and written in the shift register 273 if data other than a command.

Figure 6:
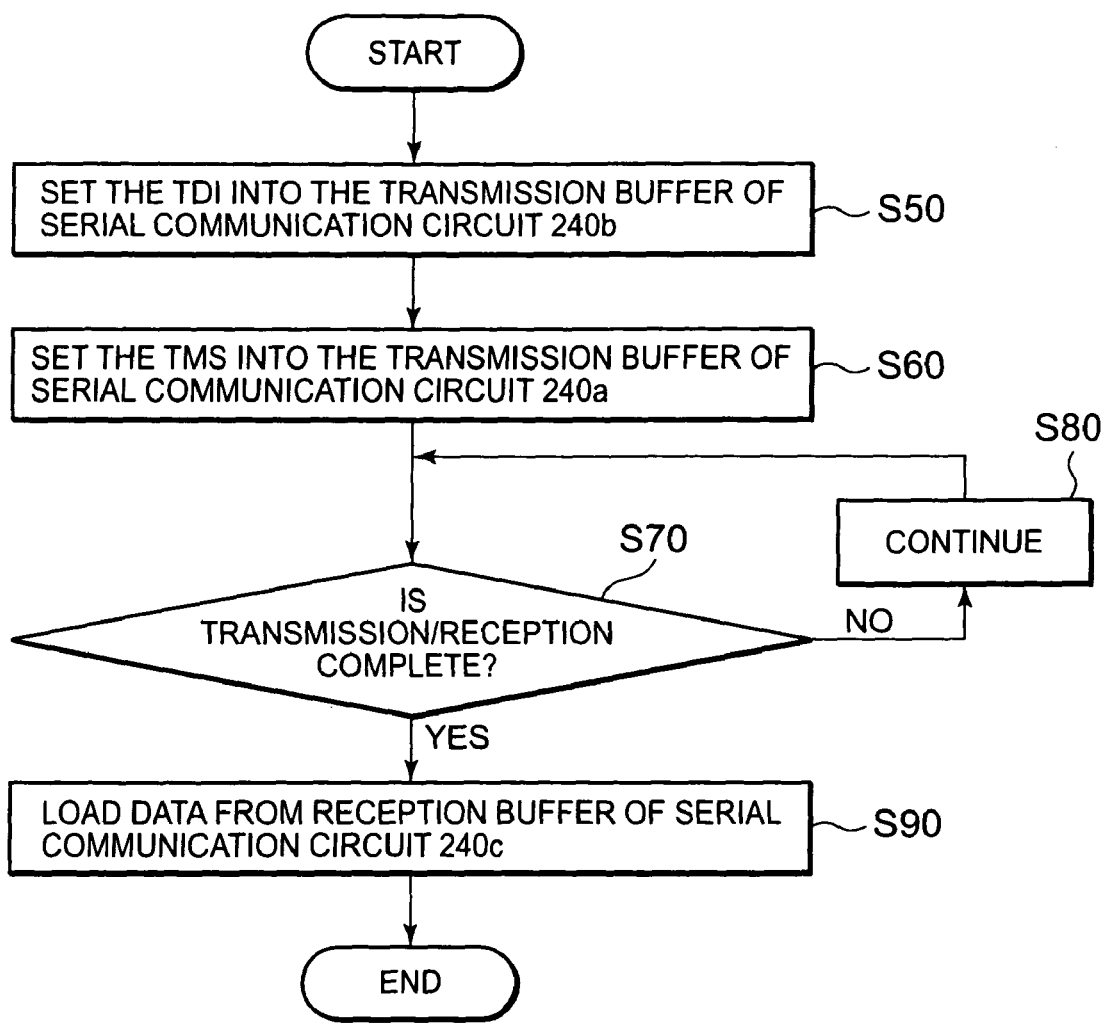
FIG. 6 is a flow chart showing the reading from the target device in the debug system shown in FIG. 3.

FIG. 6 is a flow chart showing the process when the debug communication control unit 230 is loading (reading) data from the target device. The CPU132 respectively sets (S50, S60) the TMS and the TDI in the transmission buffer for the serial communication circuit 240a and the serial communication circuit 240b at read out from the target device. Communication between the debug communication control unit 230 and the debug circuit 264 then starts when data is written into the transmission buffer of the serial communication circuit 240b, the same as during write.

The above process continues until the transmitting and receiving of data is completed (S70: No, S80). When transmitting and receiving of read-related data is finished (S70: Yes), data is read (loaded) from the reception buffer of serial communication circuit 240c, and output by the CPU132 to the debugger 114 (S90).

In the debug system 200 of the first embodiment, by making clock wiring connections for serial communication circuits outside the microcomputer, and by slaving the serial communication circuit 240b and serial communication circuit 240c to the serial communication circuit 240a, the three serial communication circuits are synchronized to the same clock signal TCK, to allow configuring an OCD (on-chip debug emulator) from an inexpensive general-purpose microcomputer, and also reduce the cost of the OCD.

Moreover, debug system can flexibly respond to changes in the debug communication system because the dedicated circuit is not the section that communicates with the target device so even if the debug communication system must be changed for example by increasing/decreasing the number of input/output (I/O) pins, this change can be implemented by changing the wiring connections on the serial communication circuit outside the microcomputer.

Second Embodiment

Figure 7:
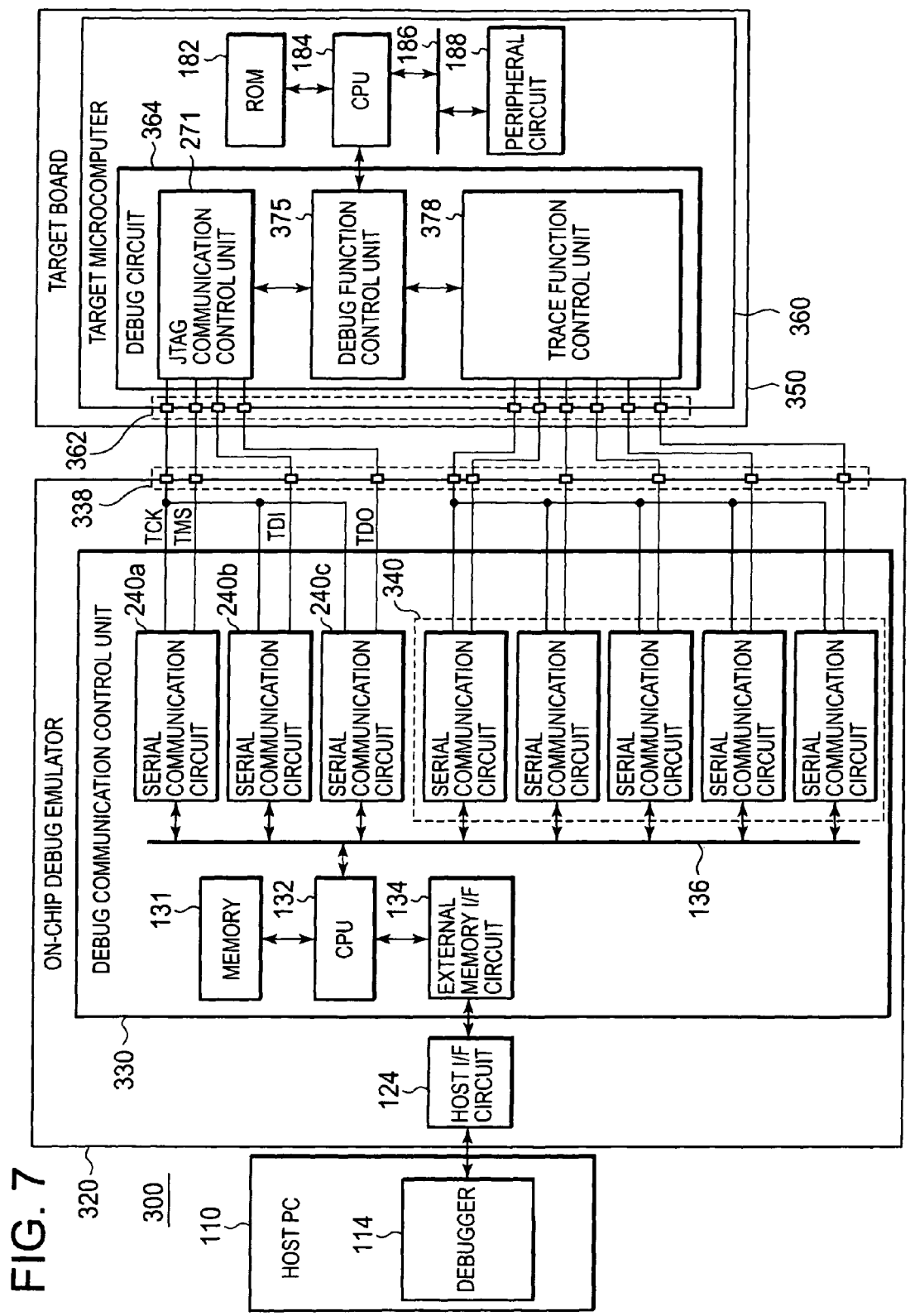
FIG. 7 is a diagram showing the debug system of the second embodiment of this invention.

FIG. 7 is a block diagram showing the debug system 300 of the second embodiment of this invention. In the following description and drawings, those sections containing the same structure or functions of the debug system 200 are assigned identical reference numerals and their detailed description is omitted.

A debug system 300 includes a host PC110, a target device containing a target board 350 and a target microcomputer 360 installed on that board, and an on-chip debug emulator (hereafter simply called emulator) 320 connected between the target device and the host PC110, for controlling communications with the target device based on commands from the host PC110.

The debug system 300 of the second embodiment also conforms to JTAG. The debug circuit 364 installed on the target microcomputer 360 contains an emulator 320 and a JTAG communication controller unit 271 for JTAG communication with the emulator 320, a debug function control unit 375, and a trace function control unit 378. The debug function control unit 375 performs debugging based on data from the JTAG communication controller unit 271 and also transfers commands to the trace function control unit 378 that arrived from the JTAG communication controller unit 271 also connected to the trace function control unit 378, and conveys data output to the emulator 320 from the trace function control unit 378, to the JTAG communication controller unit 271. The JTAG communication controller unit 271 and the trace function control unit 378 are connected by way of the emulator I/F connector 362 of target board 350, to the debug communication control unit 330 (described later) in the emulator 320.

Figure 8:
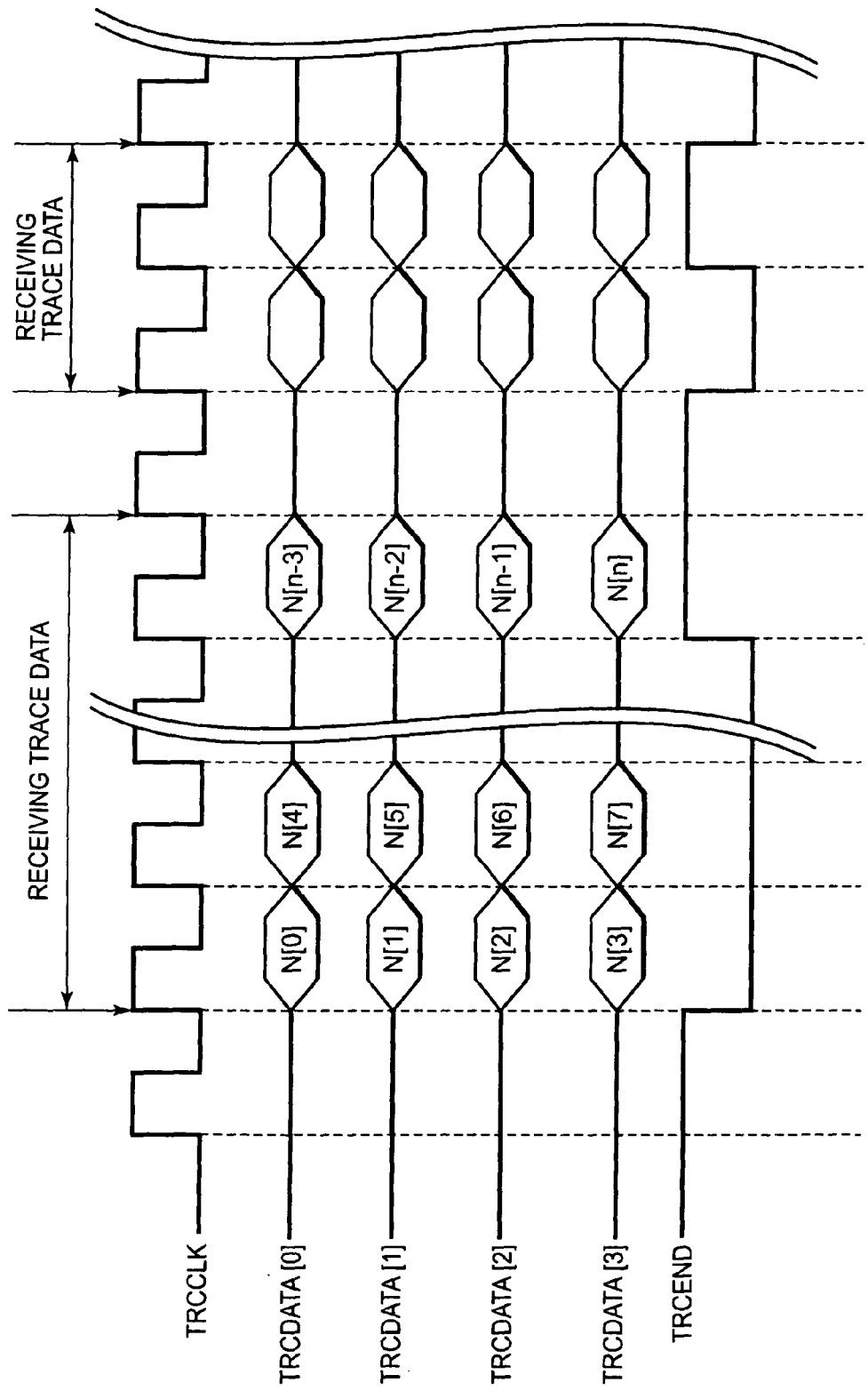
FIG. 8 is a diagram showing the trace protocol.

The trace function control unit 378 outputs information allowing tracing of the process to the emulator while the program is being executed on the target microcomputer 360. A command executed on the CPU184 is output for example in its execution sequence as data. Six signals utilized for this data are the trace clock signal TRCCLK (hereafter simply called TRCCLK), TRCEND, TRCDATA"0", TRCDATA"1", TRCDATA"2", and TRCDATA"3" and are transmitted and received while synchronized with the TRCCLK in the protocol shown in FIG. 8.

In the debug system 300 of the second embodiment, other than the point that a trace communication circuit 340 is installed in the debug communication control unit 330 of emulator 320 for receiving data from the trace function control unit 378, the other sections correspond to the debug system 200 so only the trace communication circuit 340 is described here. The debug communication control unit 330 connects by way of the target I/F connector 338 to the trace function control unit 378 and the JTAG communication control unit 271 in the target microcomputer 360.

Figure 9:
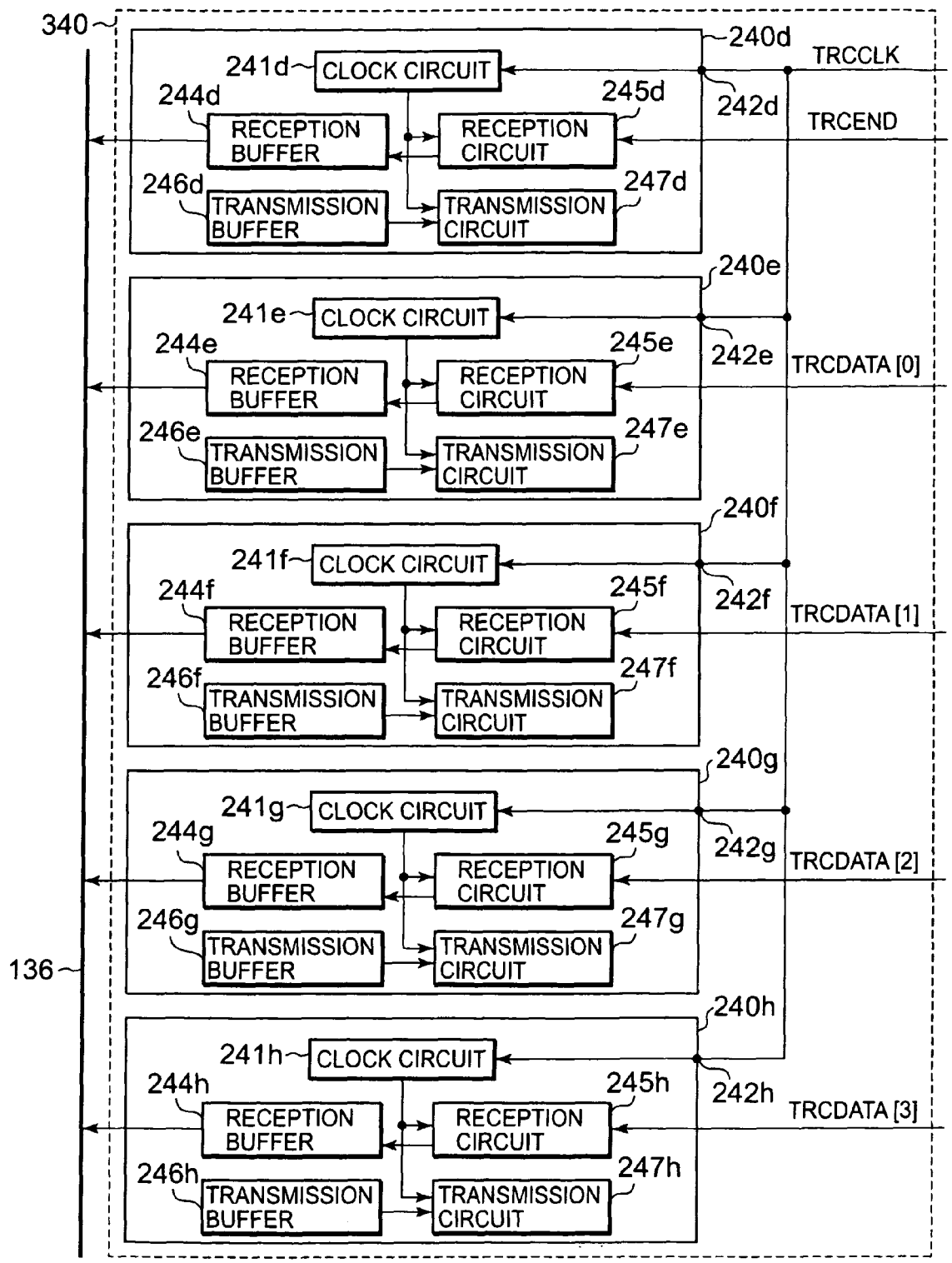
FIG. 9 is a block diagram showing in detail, the trace communication circuit of the debug system of FIG. 7.

FIG. 9 is a drawing showing the trace communication circuit 340. The trace communication circuit 340 contains five serial communication circuits 240d-240h. Each of the serial communication circuits contains a clock node, a clock circuit, a reception circuit, a reception buffer, a transmission circuit and a transmission buffer. These serial communication circuits are set to Slave, and supply clocks received from the clock node to their own reception circuit.

The clock circuit 241d in the serial communication circuit 240d receives the TRCCLK from the trace function control unit 378 by way of the clock node 242, and supplies that received TRCCLK to the transmission circuit 247d. The clock nodes 242e-242h of the serial communication circuits 240d-240h connect to the clock node 242d. These serial communication circuits also supply the TRCCLK received via the clock node, to their own reception circuit. The reception circuits in the serial communication circuits 240d-240h in other words operate in synchronization with the same clock signal TRCCLK.

The trace function control circuit 378 inputs "TRCEND, TRCDATA"0", TRCDATA"1", TRCDATA"2", TRC-DATA"3" respectively into the reception circuits 245d-245h of the serial communication circuits 240d-240h, and these are temporarily stored into the respective reception buffers. These data are transmitted and received while synchronized with the TRCCLK.

The CPU132 later loads the data stored in these reception buffers and transmits this data to the host PC110.

The transmission circuit 247d-h in each of the serial communication circuits 240d-240h are not utilized here.

The debug system 300 of this second embodiment in this way utilizes serial communication circuits in an ordinary inexpensive microcomputer to provide a JTAG interface; as well as an interface for tracing the process executed on the target device.

Third Embodiment

Figure 10:
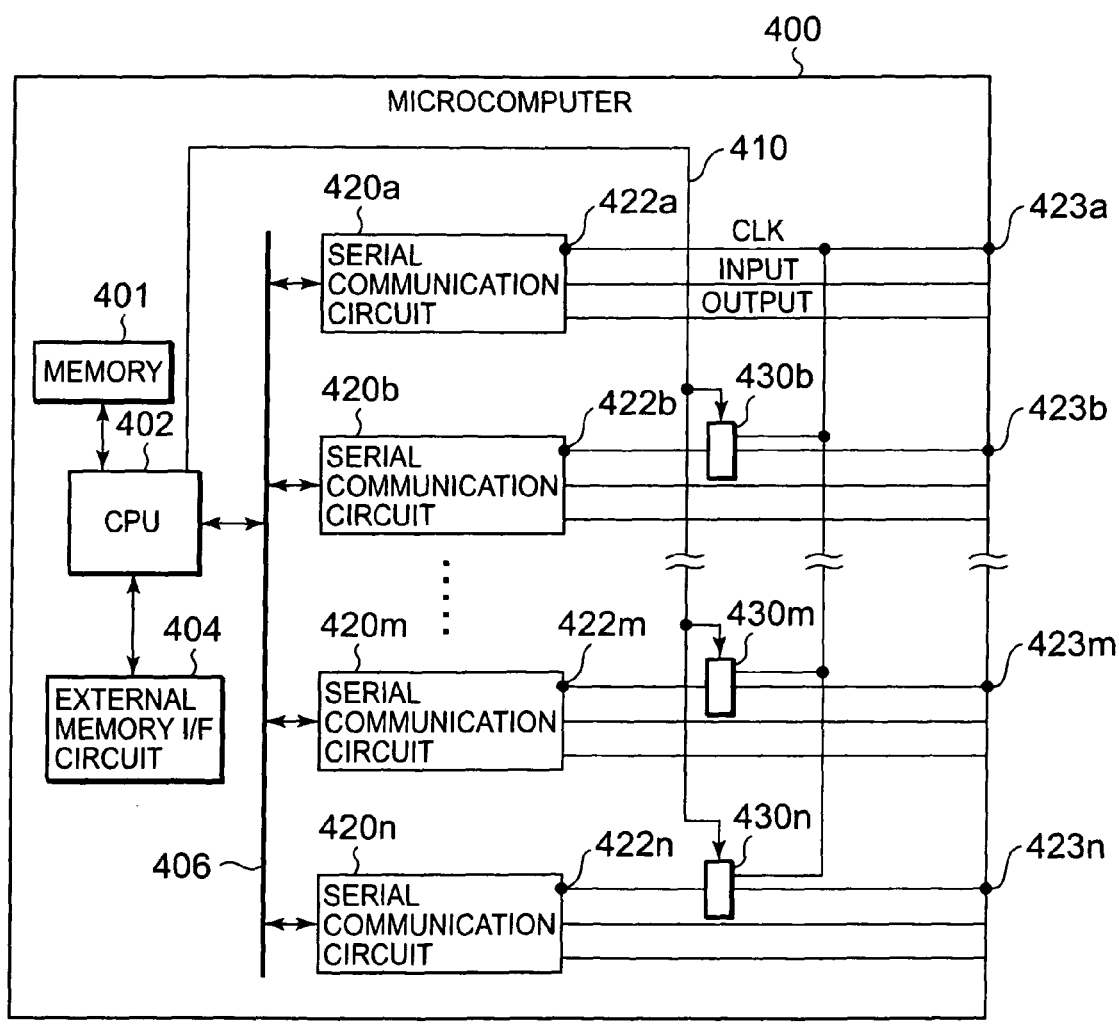
FIG. 10 is a diagram showing the microcomputer for the third embodiment of this invention.

FIG. 10 shows the microcomputer 400 of the third embodiment of this invention. The microcomputer 400 includes a CPU402, a memory 401 for storing different types of data for processing by the CPU402, an external memory I/F circuit 404 for connecting the CPU402 to an external device such as a personal computer, and multiple serial communication circuits 420a-420n. The CPU402 connects to each serial communication circuit by way of a bus 406, and is capable of transmitting and receiving data.

Switching circuit 430b-430n are respectively formed in each of the serial communication circuits 420b-420n. The CPU402 controls the switching operation of the switching circuits 430b-430n by way of the switching control line 410. The serial communication circuits and the switching circuit are each described next in detail while referring to FIG. 11. The serial communication circuits 420b-420n possess the same structure and functions. Moreover, the switching circuits 430b-430n possess the same structure and functions so only the serial communication circuit 420a, serial communication circuits 420b, and switching circuit 430b are described here.

Figure 11:
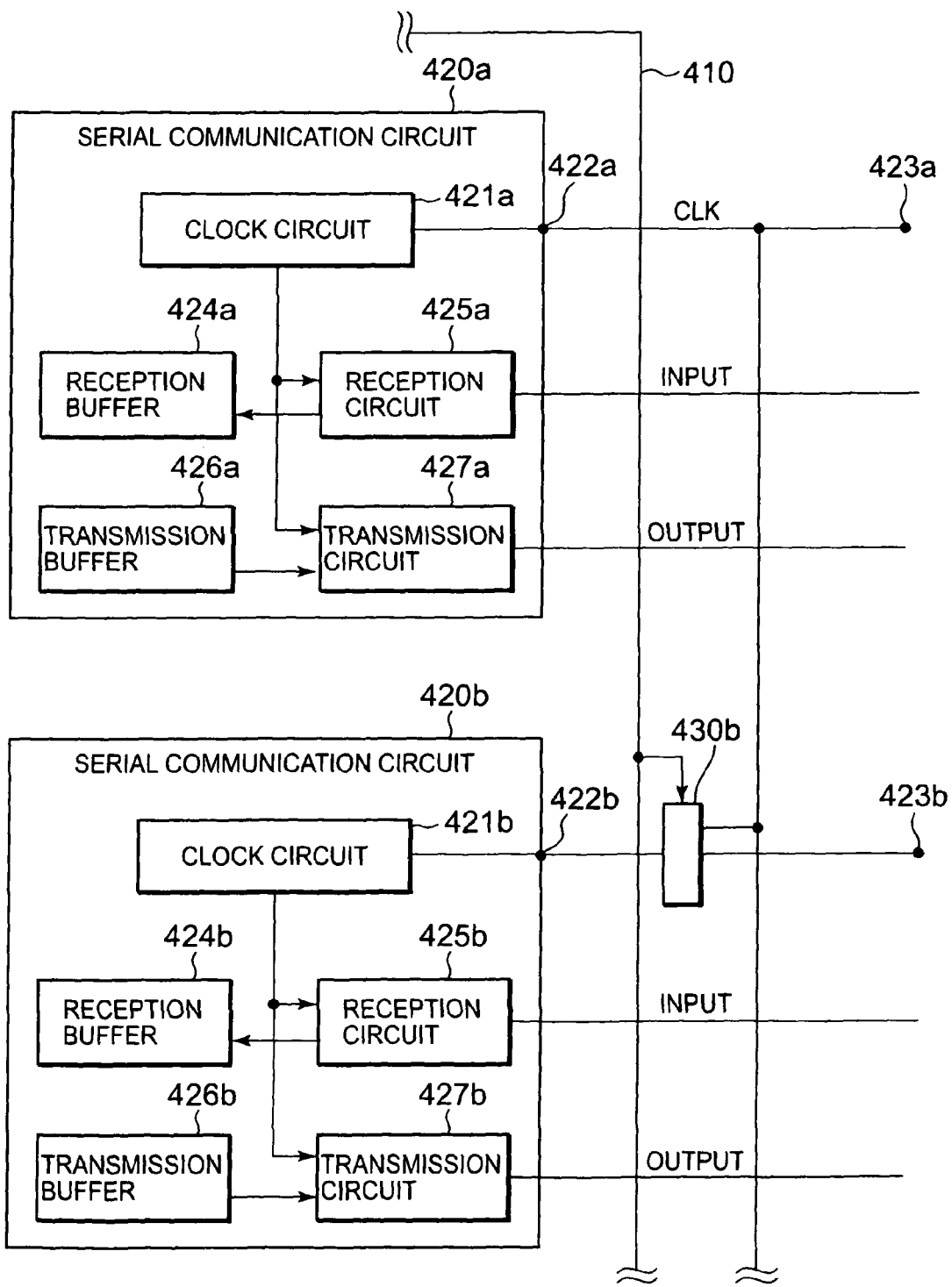
FIG. 11 is a diagram for describing the switching circuit and the serial communication circuit of the microcomputer shown in FIG. 10.
Figure 12:
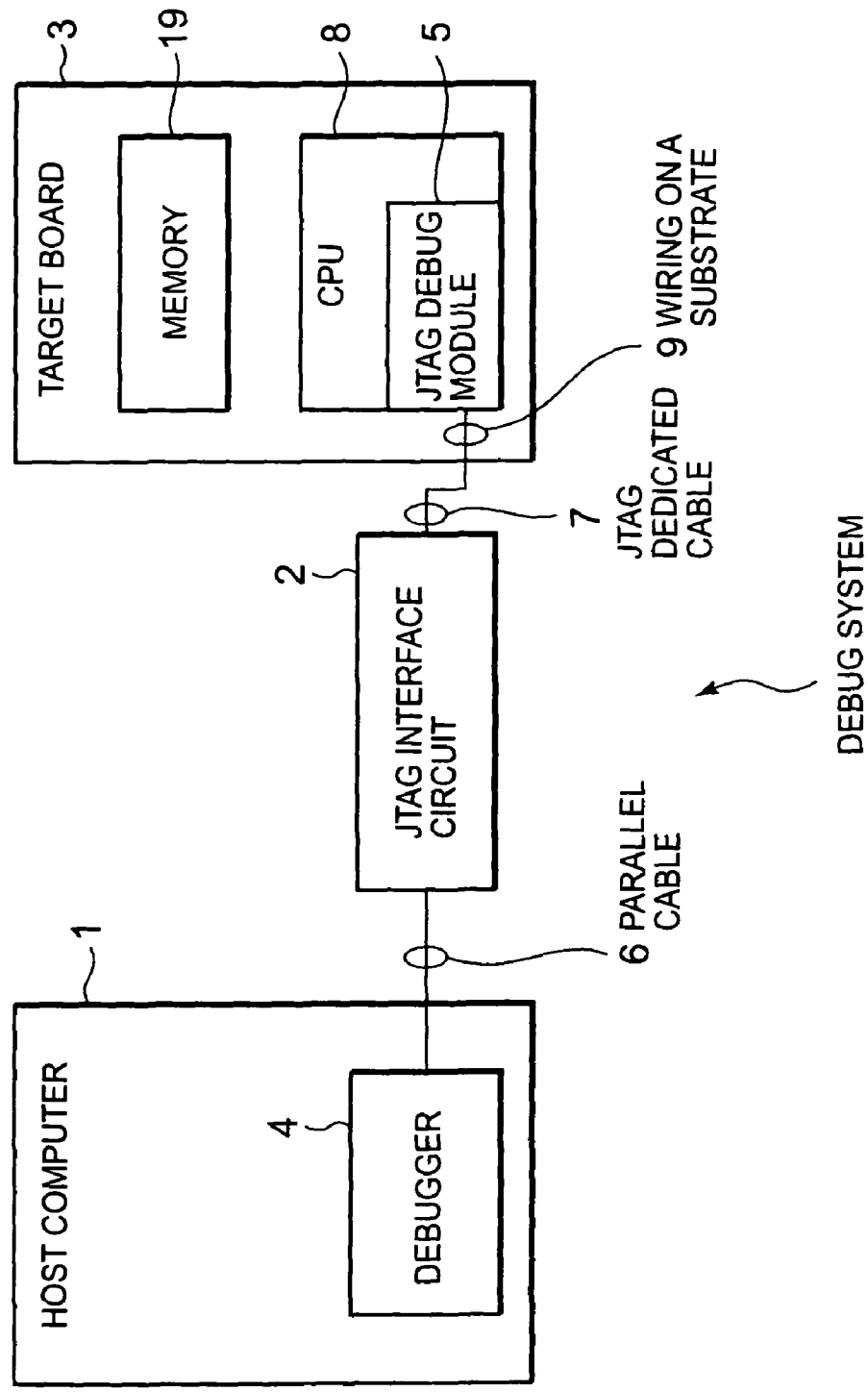
FIG. 12 is a drawing showing the debug system of the prior art.

As shown in FIG. 11, the serial communication circuit 420a includes a clock circuit 421a, a clock node 422a, a reception circuit 425a for serially receiving the reception signal input, a reception buffer 242a for temporarily storing the signal received by the reception circuit 425a, a transmission buffer 426a for temporarily storing the signal to output to the external device, and a transmission circuit 427a for serially outputting the signal stored in the transmission buffer 426a as the transmission signal output. The serial communication circuit 420a is a master, and besides supplying the clock signal CLK to its own transmission/reception circuits, also outputs a clock signal CLK from the clock node 422a.

A clock terminal 423a is installed for the serial communication circuit 420a. The clock terminal 423a externally outputs a clock signal CLK from the clock node 422a.

A serial communication circuit 420b possesses the same structure as the serial communication circuit 420a but also includes a switching circuit 430b and a clock terminal 430b. The switching circuit 430b switches between a state where the clock node 422b is connected to the clock terminal 423b, and a state where the clock node 422b is connected to the clock terminal 423a of serial communication circuit 420a.

When the clock node 422b is connected to the clock terminal 423b, the operation of clock circuit 421b differs depending on whether the serial communication circuit 420b is set to master or to slave. When set to master, the clock circuit 421b generates clocks and supplies them to the reception circuit 425b and transmission circuit 427b, and also outputs clocks by way of the clock node 422b and clock terminal 423b. On the other hand, when set to slave, the clock circuit 421b receives clock signals transmitted by way of the clock terminal 423, and supplies those clock signals to the reception circuit 425b and transmission circuit 427b. These states are the operating states of the serial communication circuit contained in the microcomputer.

On the other hand, when the clock node 422b is connected to the clock terminal 423a of serial communication circuit 420a, then the serial communication circuit 421a is set to master so the serial communication circuit 420b must be set to slave. The clock circuit 421b receives clock signals CLK output by way of the clock node 422b from the clock circuit 421a of serial communication circuit 420a and supplies them to the reception circuit 425b and transmission circuit 427b. In this state, the microcomputer 400 and the external transmission/reception device can communicate by parallel communication.

The CPU402 controls the switching circuit 430b by way of the switching control signal line 410. The switching circuit 430b may for example be switched by a switching control signal transmitted by the CPU402 via the switching control signal line 410, or may be switched after checking a value in a setting register formed in the CPU402.

The microcomputer 400 of the third embodiment configured as described above can be used as a so-called conventional microcomputer, and can also be utilized for JTAG specification OCD in the systems of the first embodiment and second embodiment just by using a switching circuit to switch the clock node connection.

As shown in FIG. 10, the microcomputer 400 of the third embodiment is wired for a switching circuit inside the microcomputer and so is not a general-purpose microcomputer but can perform parallel communication if the setting is made regardless of whether the microcomputer 400 contains a parallel I/F circuit. The microcomputer 400 moreover contains no FPGA or gate array and so is less expensive when utilized as the OCD circuit.

The description in first and second embodiments for example applied the on-chip debug emulator of this invention to JTAG type debug systems. However, this invention is applicable to all types of debug systems utilizing parallel type communication as a communication system between the target device and the emulator, and a low-cost emulator can be rendered for these systems.

Moreover this invention is not limited to a communication interface with the target device and the microcomputer based on the principle of this invention may for example include a serial communication circuit as the host I/F circuit when connected in parallel with the host PC.

Although the inventions have been described above in connection with several preferred embodiments thereof, it will be appreciated by those skilled in the art that those embodiments are provided solely for illustrating the invention are should not be relied upon to construe the appended claims in a limiting sense.

What is claimed is:

1. An on-chip debug emulator capable of connecting to the target device and a host device to perform remote debugging of a program in the target device,
    wherein the on-chip debug emulator comprises a debug communication control unit, the debug communication control unit including a plurality of serial communication circuits commonly provided with a clock signal, the debug communication control unit controlling communications with the target device based on commands output from the host device, wherein each of the plurality of serial communication circuits comprises a data buffer and serially transmits data stored in the data buffer to and from the target device while synchronized with the clock signal, wherein the debug communication control unit conforms to JTAG (Joint Test Action Group) standards, wherein the plurality of serial communication circuits include a master serial communication circuit and, a first and second slave serial communication circuits, wherein the master serial communication circuit outputs the clock signal, and transmits to the target device an operation mode control signal for controlling the operation mode of the target device while synchronized to the clock signal, wherein the first slave serial communication circuit transmits to the target device an output signal other than the operation mode control signal while synchronized to the clock signal output from the master serial communication circuit, and wherein the second slave serial communication circuit receives a signal output from the target device while synchronized to the clock signal.

2. The on-chip debug emulator according to claim 1, further comprising a microcomputer, the microcomputer including a central processing unit, a memory coupled to the central processing unit, a bus coupled to the central processing unit, and the plurality of serial communication circuits coupled to the bus.

3. A debugging method for a debug system including a host device, a target device, and an on-chip debug emulator connected between the host device and the target device, the on-chip debug emulator comprising a plurality of serial communication circuits, each of the plurality of serial communication circuits including a data buffer, each of the plurality of serial communication circuits serially transmitting data stored in the data buffer to and from the target device while synchronized with a clock signal, the debugging method comprising:

transmitting commands from the host device to the on-chip debug emulator;

commonly supplying the clock signal to the plurality of serial communication circuits; and transmitting serial data corresponding to the commands between the target device and the plurality of serial communication circuits while synchronized with the clock signal, wherein the on-chip debug emulator and the interface for the target device conform to JTAG (Joint Test Action Group) standards, wherein the plurality of serial communication circuits comprises a master serial communication circuit, a first slave serial communication circuit and a second slave serial communication circuit, and wherein the step of transmitting serial data corresponding to the commands comprises:

outputting the clock signal from the master serial communication circuit;

transmitting from the master serial communication circuit to the target device an operation mode control signal for controlling the operation mode of the target device while synchronized to the clock signal;

transmitting from the first slave serial communication circuit to the target device an output signal other than an operation mode control signal while synchronized with the clock signal output from the master communication circuit; and transmitting to the second slave serial communication circuit a signal output from the target device while synchronized with the clock signal output from the master communication circuit.

4. A microcomputer comprising:

a storage circuit;

a central processing unit being coupled to the storage circuit and executing programs stored in the storage circuit;

a first clock terminal;

a first serial communication circuit and a second serial communication circuit each including a data buffer and including a clock node; and a switching circuit switching to a first connection state where the clock node of the first serial communication circuit are connected to the clock node of the second serial communication circuit, and to a second connection state where the clock node of the first serial communication circuit are connected to the first clock terminal, wherein each of the first serial communication circuit and the second serial communication circuit serially transmits data stored in the data buffer while synchronized with a clock signal in the first connection state, wherein each of the first serial communication circuit and the second serial communication circuit further comprises a clock generator, wherein the microcomputer is installed in an on-chip debug emulator capable of connecting between a target device and a host device to perform remote debugging of a program in the target device, wherein the microcomputer controls communications with the target device based on commands output from the host device in conformance with JTAG (Joint Test Action Group) standards, wherein the switching circuit comprises a first switching circuit, wherein the microcomputer further comprises:

a third serial communication circuit including a data buffer and a clock node;

a third clock terminal; and a second switching circuit switching to a third connection state where the clock node of the third serial communication circuit are connected to the clock node of the second serial communication circuit, and to a forth connection state where the clock node of the third serial communication circuit are connected to the third clock terminal, wherein the second serial communication circuit outputs the clock signal through the second clock terminal and transmits to the target device an operation mode control signal for controlling the operation mode of the target device while synchronized with the clock signal, wherein the first serial communication circuit transmits to the target device an output signal other than an operation mode control signal while synchronized with the clock signal output from the second serial communication circuit in the first connection state, and wherein the third serial communication circuit receives a signal output from the target device while synchronized with the clock signal output from the second serial communication circuit in the third connection state.

5. The microcomputer according to claim 4, wherein the second clock terminal receives the clock signal output from the target device, the first serial communication circuit receives one of a plurality of trace signals from the target device while synchronized with the clock signal in the first connection state, and the second serial communication circuit receives other of the plurality of trace signals output from the target device while synchronized with the clock signal.

6. The microcomputer according to claim 5, wherein the clock signal output from the target device comprises a trace clock signal.

7. An on-chip debug emulator capable of connecting to the target device and a host device to perform remote debugging of a program in the target device, wherein the on-chip debug emulator comprises a debug communication control unit, the debug communication control unit including a plurality of serial communication circuits commonly provided with a clock signal, the debug communication control unit controlling communications with the target device based on commands output from the host device, wherein each of the plurality of serial communication circuits comprises a data buffer and serially transmits data stored in the data buffer to and from the target device while synchronized with the clock signal, wherein the plurality of serial communication circuits include a master serial communication circuit and, a first and second slave serial communication circuits, wherein the master serial communication circuit outputs the clock signal, and transmits to the target device an operation mode control signal for controlling the operation mode of the target device while synchronized to the clock signal, wherein the first slave serial communication circuit transmits to the target device an output signal other than the operation mode control signal while synchronized to the clock signal output from the master serial communication circuit, and wherein the second slave serial communication circuit receives a signal output from the target device while synchronized to the clock signal.

8. The on-chip debug emulator according to claim 7, further comprising:

a microcomputer,
wherein the microcomputer includes:
a central processing unit;
a memory coupled to the central processing unit; and
a bus coupled to the central processing unit,
wherein the plurality of serial communication circuits are coupled to the bus.

9. A debugging method of a debug system including a host device, a target device, and an on-chip debug emulator connected between the host device and the target device, the on-chip debug emulator comprising a plurality of serial communication circuits, each of the plurality of serial communication circuits including a data buffer, each of the plurality of serial communication circuits serially transmitting data stored in the data buffer to and from the target device while synchronized with a clock signal, the debugging method comprising:

transmitting commands from the host device to the on-chip debug emulator;

commonly supplying the clock signal to the plurality of serial communication circuits; and transmitting serial data corresponding to the commands between the target device and the plurality of serial communication circuits while synchronized with the clock signal, wherein the plurality of serial communication circuits comprises a master serial communication circuit, a first slave serial communication circuit and a second slave serial communication circuit, and wherein the transmitting of serial data corresponding to the commands comprises:

outputting the clock signal from the master serial communication circuit;

transmitting from the master serial communication circuit to the target device an operation mode control signal for controlling the operation mode of the target device while synchronized to the clock signal;

transmitting from the first slave serial communication circuit to the target device an output signal other than an operation mode control signal while synchronized with the clock signal output from the master communication circuit; and transmitting to the second slave serial communication circuit a signal output from the target device while synchronized with the clock signal output from the master communication circuit.

* * * * *